March 14, 1944.        H. H. BARNARD            2,344,198
                       INDICATING DEVICE
            Original Filed Dec. 5, 1940    2 Sheets-Sheet 1
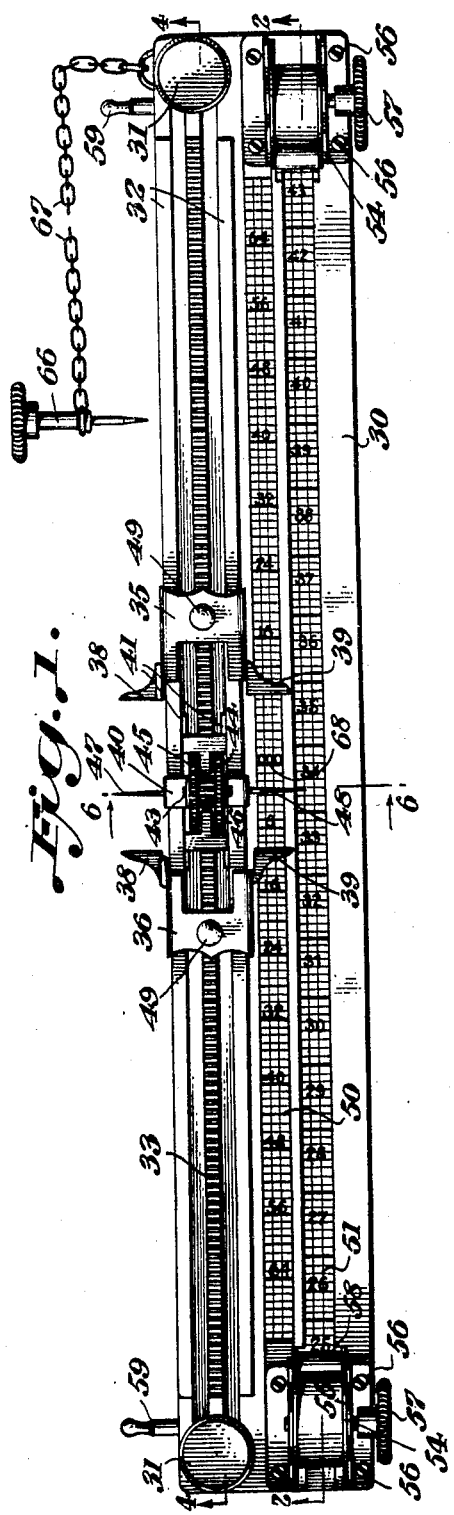
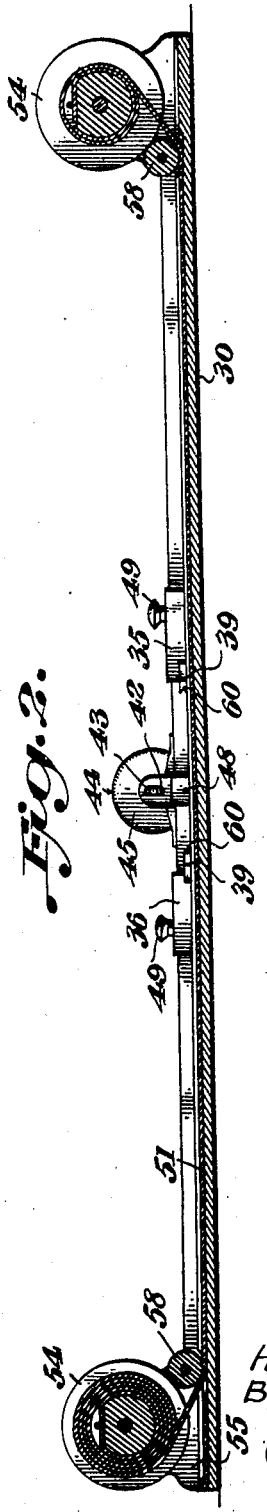
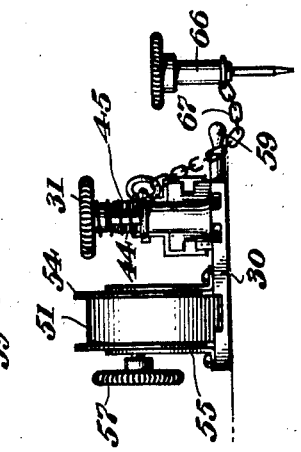
Inventor:
Henry H. Barnard
By
Young, Emery & Thompson
Attys.

March 14, 1944.  H. H. BARNARD  2,344,198
INDICATING DEVICE
Original Filed Dec. 5, 1940   2 Sheets-Sheet 2
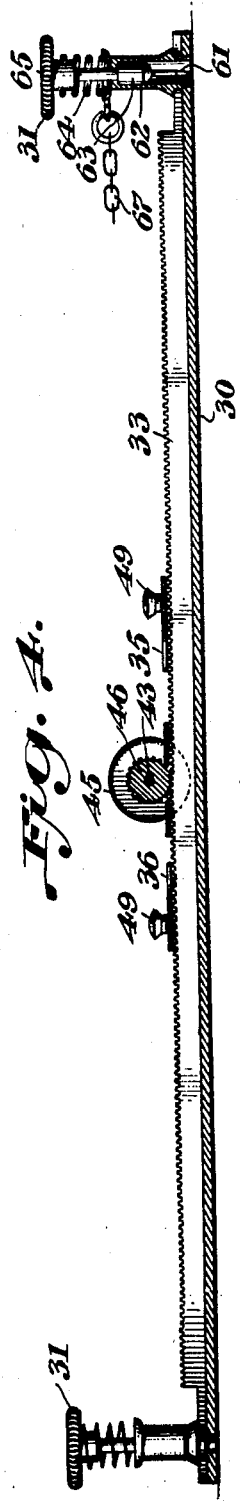
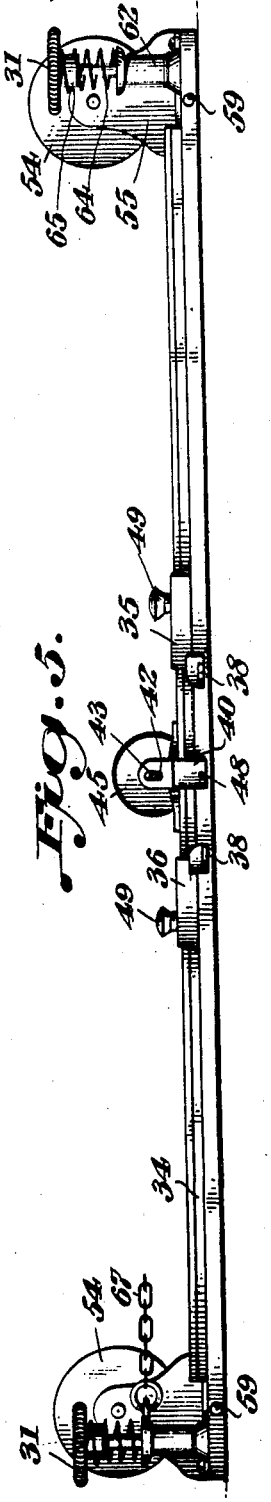
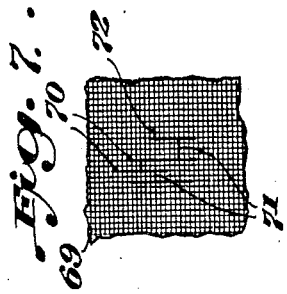
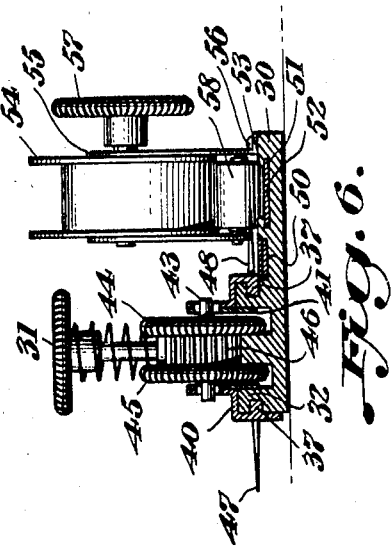
Inventor:
Henry H. Barnard
By Young, Emery + Thompson
Attys.

Patented Mar. 14, 1944

2,344,198

UNITED STATES PATENT OFFICE 2,344,198

INDICATING DEVICE

Henry H. Barnard, Washington, D. C.

Original application December 5, 1940, Serial No. 368,696. Divided and this application January 26, 1942, Serial No. 428,302

14 Claims. (Cl. 116—135)

The present invention relates to devices for precisely indicating in general changes of or actual values, functions of machines and materials, and more specifically the sale prices of stocks, bonds, commodities, etc., whereby the range as well as volume or quotations of such items may be precisely observed and recorded. Hereinafter reference will only be had to transactions for stocks but it is understood that the invention is equally applicable to any item or function where it is desired to precisely observe and indicate fluctuations, volume and changes, in any unit of time and from day to day.

It is therefore an object of the invention to provide devices to set up and indicate stock market quotations, such as sale prices whereby the range of one or more or groups of stocks may be continuously and precisely indicated in cooperation, if desired, with a graph or diagram, upon receiving information of such quotations by a stock ticker, or by other means, so that at any time during a market session the device will indicate the previous sessions' close or the opening price or sale as well as the high and low sales or prices. In this manner it is possible to follow the trend or range, that is, activity, of the market as the session progresses which will also be an indication of the support or non-support of the particular issue or issues of the market.

A still further object of this invention is to provide manual means for precisely indicating by graph or diagram continuously from day to day the price of one or more stocks so that the trend or movement of the prices may be ascertained and compared as the market is in session and wherein means is provided for enabling the price at a given time of one or more stocks to be instantly observed and such price or prices compared with previous high and low prices.

A further object of this invention is to provide a machine for graphically indicating stock quotations wherein means or an indicating device is provided, preferably in the form of a scale representing fractional stock quotations and an indicator, for precisely and successively displaying or indicating the various price quotations of a stock and in which means is provided for operating the indicating device so as to display successive prices in the stock and at the same time for operating a graphical indicating mechanism to assist in forming a record or diagram embodying each change in price.

Further objects will be apparent from the following description taken in connection with the accompanying drawings showing various embodiments of the invention and in which:

Figure 1 is a plan view of a manually operable indicating device, or machine,

Fig. 2 is a longitudinal sectional view of the device taken on line 2—2 of Fig. 1 in the direction of the arrows, Fig. 3 is an end view of the device of Fig. 1.

Fig. 4 is a longitudinal sectional view of the device taken on line 4—4 of Fig. 1 in the direction of the arrows, Fig. 5 is a side elevation of the device of Fig. 1, Fig. 6 is a cross section taken on line 6—6 of Fig. 1 in the direction of the arrows, and Fig. 7 is a plan view of a portion of the graph paper sheet.

The indicator is of the type which is manually operable. The instrument has all of its parts mounted on a base plate 30 having a spring-pressed fastening pin 31 at each end thereof to fasten the instrument on a board or other support where desired. The base plate 30 is provided at one side, Fig. 1, with a pair of spaced integral guide tracks 32 extending longitudinally along the plate and parallel to each other with a toothed rack 33 intermediate and parallel to the tracks. These tracks 32 have on one side a groove 34, Figs. 5 and 6, which acts as a guide for the indicating or marking sliders 35 and 36, of which there are two in number, and each slider extends over both tracks 32 bridging the intervening space including the rack 33 and is provided with an actuating knob 49. Also each slider has opposed laterally extending tongues 37, Fig. 6, which extends into the grooves 34 so that while the sliders can move easily they will not change their position or drop if the instrument is held or mounted in a vertical position. Each slider has a pair of oppositely extending pointed or marking edges 38 and 39, the purpose of which will be explained.

An intermediate slider or indicator 40, also slides and moves on the guide tracks 32 and has inwardly directed tongues 37 contacting in and sliding in the grooves 34. The indicator 40 also has side plates 41, Fig. 6, which tend to contact the internal sides of the tracks 32 opposite the sides in which the grooves 34 are provided. The plates 41 as well as the main parts or frame of the slider 40 are provided with vertically elongated slots 42, Figs. 2 and 5, in which a shaft 43 of an actuating roller 44 is rotatably mounted. The actuating roller 44 has a pair of spaced peripherially knurled or milled disks 45 between which a gear 46 is provided and interconnects said disks 45, the shaft 43, disks 45 and gear 46 being preferably made integral. As shown in Fig. 6 the gear 46 meshes with the rack 33 so that by actuating the knurled edges of the disks 45 by a finger of the operator the slider will travel along the tracks 32. The slider 40 is also provided with a pair of oppositely directed pointers 47 and 48 in the form of sharp pins which are suitably secured to the frame of the slider for the purpose which will be explained.

The indicating instrument is provided with a pair of scales 50 and 51, Figs. 1 and 6, provided in suitable grooves for this purpose in the base plate. The scale 50 is intended to be fixed, for the purpose which will be explained, but the scale 51 is movable and adjustable, which for the latter purpose the scale, in the form of a band, travels in the groove 52, Fig. 6, in the base plate 30 having overlapping sides 53 along the longitudinal edges thereof and is provided with reels or spools 54, Fig. 2, on which the ends of the band are fastened and wound. Each reel 54 on each end of the plate 30, is rotatably mounted in brackets 55 with frictional contact on the adjacent sides and these brackets are suitably secured on the plate 30 by means of screws 56, Fig. 1. Also each reel 54 is provided with a manual actuating knob or wheel 57 and an idler roller 58 each of which is rotatably mounted in a bracket 55 to maintain the band down in the bottom of the groove 52. Upon turning either knob 57 the band 51 may be adjusted, that is by turning the left hand knob 57, Fig. 1, clockwise or the right hand knob counter-clockwise each time winding the band or tape 51 on its driving reel in the desired direction and pulling it from the other reel for the purpose which will be explained.

A pair of abutments 59, Figs. 1 and 5, are provided in the base plate 30, one on each side end thereof for the purpose of protecting the pointed ends of the pointers 47 and 38 so that if the instrument is placed or accidentally falls on its longitudinal edge on the side adjacent the fastening pins 31 the rather sharp points will not be damaged. Also as seen in Figs. 2 and 5 the marking edge 60 of each pointer 38 and 39 is concave along its longitudinal edge so that the sliders 35 and 36 when brought together against the indicator 40, the end points of the pointers 38 and 47, and 39 and 48, respectively, will all point and indicate as near as possible to a single point or mark.

Each fastening pin 31 is in the form of a push pin 61 mounted in a cylinder 62 secured on each end on the base plate 30. Each pin 61 has an enlarged portion 63 which abuts against the top end of the cylinder 62 and the pin is provided with a spring 64 and a head portion 65. When the instrument is placed on a board or other support it is securely held in place by pushing down the pins 61, but by pulling up on the head portions 65 the instrument is released. As a safety measure, it is desirable to provide an auxiliary pin 66, Fig. 1, fastened to one of the pins 31 by means of a chain 67 whereby upon inadvertent release of the pins 31 the instrument will not fall to the floor assuming that the instrument is used on a board arranged at a slight angle from the vertical.

The instrument operates as follows, assuming that it is used in connection with a single day's transactions for a particular stock and is used in cooperation with a graph paper; the latter being mounted on a board.

The instrument is first adjusted by setting the pointers 47 and 48, of the slide 40, in the central position so that the pointer 48 will register with the "0" mark 68, Fig. 1, on the permanent scale 50. The slides 35 and 36 are then brought against the center slide 40 so that pointers 38 and 47 as well as 39 and 48 will be adjacent to each other. The instrument is then so placed on the graph paper 69, Fig. 7, to underlie the left edge of the structure of Fig. 6; on which every vertical line 70 represents the extreme range, high and low prices of a particular day's transactions, and the horizontal lines 71 represent the closing price for the particular day represented by the left hand vertical line; by placing pointers 38 and 47 on the closing price line 72, the longitudinal axis of the instrument being parallel with the lines 70. The instrument is then fastened down by pushing the pins 61 into a board and placing the auxiliary pin 66 in the board above the instrument as a safeguard. The next step is to adjust the movable band 51 so that pointers 48 and 39 will indicate the exact closing price, on the band 51, of the previous day, as represented by the line 72.

The instrument is now ready for use and as an example, it might be assumed that the pointer 48 is set at "35" which represents the previous day's closing price. The first sale price may be "36" which is indicated by moving the center slide 40 to the right, Fig. 1, by rotating the disks 45 and therewith the gear 46 which, due to the toothed rack 33, will move the slide 40 which is manually stopped when the pointer 48 registers with the "36" line of the scale 51. This movement of the slide 40 will move before it the slide 35 to the right so that its pointer 39 will also point to the "36" line on scale 51.

The next transaction is similarly recorded by moving the slide 40 either to the right or left, Fig. 1, depending upon whether the succeeding transactions are higher or lower than the preceding transactions. It is obvious that the pointers 39 and 48 as well as 38 and 47 will indicate the range, high and low, as well as the last transaction at any time, and it can be momentarily observed as to the high and low range and last transaction of that day whereas the pointers 38 and 47 will indicate the same information, but it can be observed in relation to the previous day or day's transactions and said pointers are thus preparing the necessary information to be placed on the permanent record, sheet 69, after the last transaction of the day has been completed. It can, for example, be assumed that the slides 35, 36 and 40 are in the position indicated in Fig. 1 at the close of the day's transactions in which pointers 38 and 39 indicate the high and low prices as a range with the pointers 47 and 48 indicating the closing price. A vertical line 70 is now drawn on the graph paper 69 to indicate the range for the day and a short horizontal line 71 to indicate the last or closing price transaction. It is, of course, obvious that the pointers 38 and 47, or merely 47, can be provided with or may constitute an inking or marking pen so that the permanent line 70 may be applied or drawn on the sheet 69 as the transactions are carried out. The edges 38 may be used as straight edges, if desired, to mark the horizontal lines 71 on the graph paper 69.

The purpose of the slot 42 for the shaft 43 is to permit the disks 45 and gear 46 to be raised so that the latter will not mesh with the rack 33 to move the slider 40 quickly without any rotary action.

This application is a division of applicant's copending application, Serial No. 368,696, filed December 5, 1940, said co-pending application having matured into Patent No. 2,329,686, September 21, 1943.

I claim as my invention:

1. An indicating device comprising a base plate, a guide track arranged on the base plate, an indicating slider mounted on the guide track having an indicating means and manual actuating means, and cooperating means between the guide track and the slider to move the slider on the guide track when actuated by the manual actuating means.

2. An indicating device according to claim 1, in which a scale is provided on the base plate and the slider is provided with a second indicating means cooperating with the scale.

3. An indicating device according to claim 1, in which the guide track and the slider are provided with intermeshing teeth forming the cooperating means.

4. A manually operable indicating device comprising a base plate, a central indicating slider and pointer and a pair of indicating sliders each having a pointer slidably mounted on the base plate with the pair of sliders mounted one on each side of the central indicating slider, and means on the base plate to guide the sliders toward and away from each other and in contact with each other and when the sliders are in contact with each other all three of their pointers will terminate at a common point.

5. A manually operable indicating device comprising a base plate, a central indicating slider and pointer and a pair of indicating sliders each having a pointer slidably mounted on the base plate with the pair of sliders mounted one on each side of the central indicating slider, and means on the base plate to guide the sliders toward and away from each other and in contact with each other and when the sliders are in contact with each other all three of their pointers will terminate at a common point, the pointers of the pair of sliders each having a concave edge to accommodate the pointer of the central slider.

6. An indicating device according to claim 4, in which means are provided on the central slider and the guide means to manually adjust the central slider along the guide means.

7. A manually operable indicating device comprising a base plate, a central indicating slider and pointer and a pair of indicating sliders each having a pointer slidably mounted on the base plate with the pair of sliders mounted one on each side of the central indicating slider, means on the base plate to guide the sliders toward and away from aech other and in contact with each other and when the sliders are in contact with each other all three of their pointers will terminate at a common point, and means on the central slider and the guide means to move the central slider on the guide means.

8. A manually operable indicating device comprising a base plate, a central indicating slider and pointer and a pair of indicating sliders each having a pointer slidably mounted on the base plate with the pair of sliders mounted one on each side of the central indicating slider, means on the base plate to guide the sliders toward and away from each other and into abutting contact with each other and when the sliders are in contact with each other all three of their pointers will terminate at a common point, and cooperating contact means on the central slider and the guide means to move, when in contact, the central slider on the guide means for fine adjustment and slots in the slider to prevent contact of the cooperating means to render such movable means ineffective during coarse adjustment.

9. A pointer slide member for the guide track of indicating devices comprising a frame adapted to be slidably mounted on the guide track, a pair of spaced disks and an intermediate member provided in the space between the disks and connected to each other, and means for rotatably mounting the disks and member in the frame, said disks being manually operable to adjust the slide member on the guide track.

10. A slide member according to claim 9, in which the disks and intermediate member are integral and the mounting means is a shaft.

11. A pointer slide member for the toothed guide track of indicating devices comprising a frame adapted to be slidably mounted on the guide track, a pair of spaced disks integral with an intermediate member provided in the space between the disks, said intermediate member being in the form of a gear meshing with the toothed guide track, and means for rotatably mounting the disks and member in the frame.

12. A pointer slide member according to claim 11, in which the frame is provided with slots to permit the disks and intermediate member to be raised relative to the guide track whereby the gear will be out of mesh with the toothed guide track for rapid movement of the slide member.

13. An indicating device comprising a base plate, a pair of spaced guide tracks extending longitudinally on the base plate, a central indicating slider mounted on the guide tracks, a pair of indicating sliders mounted on the guide tracks one on each side of the central indicating slider, and means on the base plate and between the guide tracks and on the central indicating slider to actuate the latter which thereby moves either one of the pair of indicating sliders by abutment therewith in the direction of travel of the central slider, said means including a gear rack mounted on the base plate and between the guide tracks and a gear rotatably mounted on the central slider meshing with the gear rack.

14. An indicating device comprising a base plate, a guide track arranged on the base plate, an indicating slider mounted on the guide track having an indicating means and manual actuating means, and cooperating means between the guide track and the slider to move the slider on the guide track when actuated by the manual actuating means, said guide track and the slider being provided with intermeshing teeth constituting the cooperating means, and the slider being provided with means to permit the manual actuating means to be lifted from intermeshing contact of the teeth.

HENRY H. BARNARD.